Patented Nov. 21, 1944

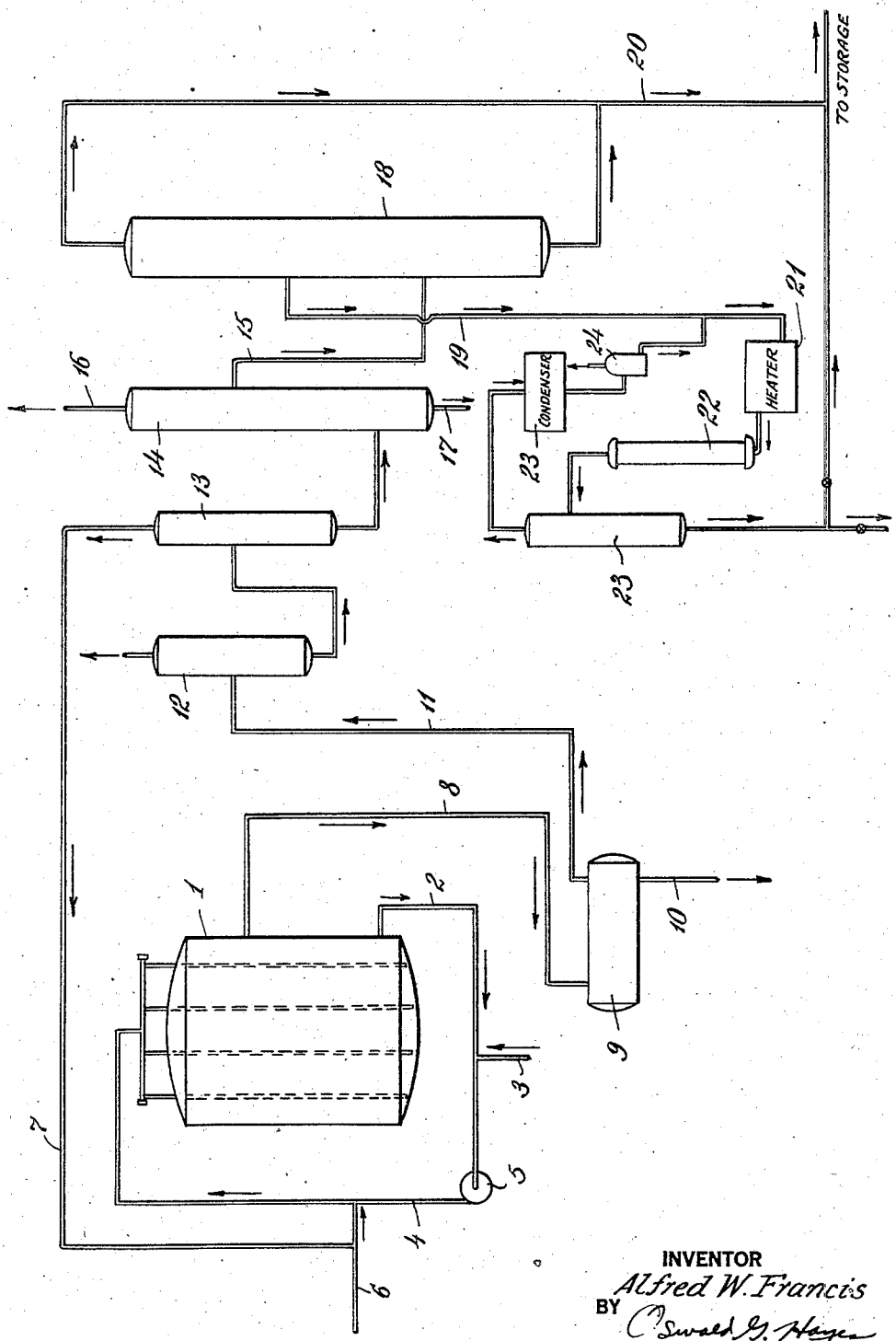

2,363,171

UNITED STATES PATENT OFFICE 2,363,171

TREATING PETROLEUM DERIVATIVES AND PRODUCTS THEREOF

Alfred W. Francis, Woodbury, N. J., assignor to Socony-Vacuum Oil Company, Incorporated, New York, N. Y., a corporation of New York Application January 21, 1942, Serial No. 427,546

6 Claims. (Cl. 260—673.5)

This invention relates to a process for treating petroleum derivatives and is more specifically directed to a process for removing a fraction from gasolines made up primarily of isomeric octanes and treating the removed fraction to convert the constituents thereof to more valuable hydrocarbons which may then be returned to the gasoline or utilized for other purposes for which it is well suited.

Aviation gasolines of octane values, unleaded, in the neighborhood of 90 are readily prepared on a commercial scale by processes now in rather wide use. For example, a very high grade motor fuel is derived by alkylation of iso-butane with butylenes in the presence of cold sulphuric acid. Other known processes use heat and/or catalysts such as metallic halides and the like to produce equivalent products. Regardless of the method of preparation, the composition obtained is made up of iso-octanes in proportions more or less characteristic of the process but which are of the same order in products of all the known processes. My invention contemplates the improvement of these products, known as "alkylate," by treatment in a manner disclosed below.

I have found that the octane number of these alkylates may be greatly improved by removing therefrom the fraction boiling between about 104° C. and 111° C., subjecting the removed fraction to an aromatization treatment and returning it to the alkylate. As a general rule, removal of the said fraction, which normally constitutes about 15% of the alkylate, raises the octane number from about 94 for the alkylate to about 97 for the residue; while return of the treated fractions gives a composition having an octane number of at least 100.

Preferably the alkylate is originally prepared by alkylation of iso-butane with butylenes in the presence of a fluid acid catalyst such as sulphuric acid, hydrofluoric acid and the like. A specific embodiment of the invention is therefore discussed herein as including such an alkylation step and the process may advantageously be conducted in a plant constructed in accordance with the annexed drawing which is a diagrammatic illustration of a preferred embodiment.

The alkylation reaction is primarily conducted in a reactor 1, containing a relatively large amount of a reaction mixture resulting from mixing iso-butane, butylenes and a fluid acid catalyst in suitable proportions, as is well known in the art. From the reactor 1, a stream of the reaction mixture is continuously withdrawn through line 2, a portion of fresh catalyst is added thereto from line 3 and the mixture agitated and propelled through return pipe 4 by means of pump 5. Fresh feed stock, including iso-butane and butylenes, from a suitable source supplied through pipe 6 and recycled iso-butane from recycle line 7, are added to the stream in pipe 4 and the whole is then supplied to the body of fluids in reactor 1, preferably with agitation.

A second stream is withdrawn from the mass in reactor 1, and passed by means of pipe 8 to a settler 9 wherein the fluid catalyst is separated from the hydrocarbons and the acid layer withdrawn through line 10, a part of the acid being preferably recycled to the process while the remainder is withdrawn from the system as spent catalyst. The hydrocarbon layer from the settler 9 is passed through line 11 to a fractionator wherein light gases such as propane are separated out for use as fuel and other purposes to which the gas is suited. Thence the liquid bottoms are transferred to fractionator 13 from which iso-butane contained therein is taken overhead for recycling to the alkylation reactor 7, as noted above.

The remaining hydrocarbons are then transferred to a fractionating column 14, wherein an intermediate fraction boiling between 95 and 130° C. is taken as alkylation product through line 15, while light and heavy ends are rejected through lines 16 and 17, respectively. Thus far, the process is more or less conventional and may be operated in accordance with any of the suitable methods, of which many types and variations are known. It is to be understood, of course, that apparatus for the present purpose, described both above and below, includes such additional equipment as reboilers, pumps, valves and the like where desirable between settler 9 and fractionator 12. One element preferably included is a caustic washing stage.

The product drawn off through line 15 is usually a fraction consisting predominantly of isomeric octanes varying in physical properties and in octane number. Among these are some portions which have a relatively low octane number and which tend to seriously reduce the octane number of the alkylate, either as a motor fuel alone or as a blending agent for preparation of high anti-knock gasolines from inferior distillates. According to the present process, the alkylate previously regarded as the final product of the process is closely fractionated in a column 18 equivalent to about 50 theoretical plates to separate therefrom an intermediate fraction boiling between about 104° C. and 111° C. The said intermediate cut, which constitutes something like 15% of the alkylate and has an octane rating of about 70, is taken through line 19 for further processing; while the overhead and bottoms are reunited in pipe 20 to form a hydrocarbon mixture of 97 clear octane number as compared with 94 for the alkylate of line 15.

The intermediate fraction from line 19 is heated in heater 21 to a temperature proper for dehydrogenating cyclization and passed to a catalyst chamber 22 containing a catalyst for converting aliphatic hydrocarbons to aromatic hydrocarbons. Suitable catalysts, as previously described, are oxides of metals of the IV, V and VI groups of the periodic table, preferably supported on a carrier such as alumina or silica gel. Any of the known catalysts for the purpose may be used, temperatures and other conditions of treatment being adjusted to proper operation with the catalyst selected. For example, chromium sesquioxide on alumina may be used at temperatures of about 500° C. Preferably the conditions of aromatization are maintained relatively mild as concerns temperature, pressure and time of contact, since drastic conditions appear to have a substantial detrimental effect.

The product of the catalytic treatment in chamber 22 is fractionated in a column to separate a high boiling fraction as the desired composition and an overhead suitable for recycling to the catalyst in chamber 22. The overhead is condensed in a suitable condenser 23 and separated from fixed gases in a separator 24, whence the liquid is returned to line 19 for recycling with a fresh fraction from column 18. The bottoms from column 23 have a blending value in 60–40 octane heptane mixture of about 125 A. S. T. M. and may be blended with the mixture in line 20 to produce a blend having a clear octane number in excess of 100, usually about 101. Because of the highly aromatic nature of the bottoms from column 23, they are useful for many other purposes in addition to blending with fuel distillates derived from line 20 or other source. For example, the aromatic mixture is an excellent solvent for resins and the like and may also be utilized as an intermediate in the preparation of explosives and other chemical products of various types.

A consideration of the composition of cold sulphuric acid alkylates reveals that the fraction treated according to the present process probably consists predominantly of low octane number dimethyl hexanes.

*Some paraffins reported in cold acid alkylate (95–130° C. fraction)*

| Paraffin | Boiling point °C. | O. N. | Percentage (approx.) |
|---|---|---|---|
| 2,2,4 trimethyl pentane | 99.23 | 100 | 34 |
| 2,5 dimethyl hexane | 109.25 | 55.7 | 12 |
| 2,4 dimethyl hexane | 109.8 | 69.9 | |
| 2,3,4 trimethyl pentane | 113.5 | 97 | 25 |
| 2,3,3 trimethyl pentane | 115.1 | 99.1 | 25 |
| 2,2,5 trimethyl hexane | 124.1 | 91.2 | 4 |

According to the literature relative to aromatization of paraffins, m-xylene and p-xylene would result, respectively, from such treatment of 2,4 dimethyl hexane and 2,5 dimethyl hexane respectively, the high octane numbers of these xylenes would then explain the very marked improvement to be obtained by blending them back to the remainder of the alkylate from which the dimethyl hexanes (if that is their nature) were removed.

Reason can also be found here for the above recommendation that conditions of aromatization be mild. Drastic conditions would probably result in isomerization of meta and para xylenes to ortho xylene which has a higher boiling point and lower octane number as shown by the following table:

| Xylene isomer | Ortho | Meta | Para |
|---|---|---|---|
| Blending value in 60–40 {A. S. T. M. | 102.5 | 124 | 126.5 |
| octane heptane mixture {Research | 120 | 134.5 | 145.5 |
| Boiling point °C. | 144.05 | 139.30 | 138.40 |

I claim:
1. A process for preparing a hydrocarbon motor fuel which comprises alkylating iso-butane with butylene, separating from the alkylate product a fraction boiling between about 104° C. and about 111° C., subjecting said fraction to a dehydrogenating cyclization reaction and returning the product of said reaction to said alkylate product.

2. The process which comprises separating dimethyl hexanes from a mixture of isomeric octanes, subjecting said dimethyl hexanes to a dehydrogenating cyclization reaction and blending the product of said reaction with the isomeric octanes from which said dimethyl hexanes were separated.

3. In a process for preparing a hydrocarbon fuel of high octane number wherein iso-butane is alkylated with butylene in the presence of a fluid acid catalyst, the catalyst separated from hydrocarbons, and the hydrocarbons fractionated to obtain an alkylate fraction boiling between about 95° C. and about 130° C.; the improvement which comprises separating from said alkylate fraction an intermediate fraction boiling between about 104° C. and 111° C., subjecting said intermediate fraction to a dehydrogenating cyclization reaction and blending the product of said reaction with the remainder of said alkylate fraction.

4. The process which comprises separating dimethyl hexanes from a mixture of isomeric octanes, subjecting said dimethyl hexanes to a mild dehydrogenating cyclization reaction and blending the product of said reaction with the isomeric octanes from which said dimethyl hexanes were separated.

5. A process for preparing a hydrocarbon motor fuel which comprises alkylating iso-butane with butylene, separating from the alkylate product a fraction consisting essentially of dimethyl hexanes, subjecting said fraction to a mild dehydrogenating cyclization reaction and returning the product of said reaction to said alkylate product.

6. A composition of matter prepared by separating dimethyl hexanes from a mixture of isomeric octanes, subjecting said dimethyl hexanes to a dehydrogenating cyclization reaction and blending the product of said reaction with the isomeric octanes from which said dimethyl hexanes were separated.

ALFRED W. FRANCIS.